United States Patent
Beatrice et al.

[11] Patent Number: 5,374,085
[45] Date of Patent: Dec. 20, 1994

[54] LOCKING DEVICE FOR FLUID COUPLING

[75] Inventors: Kenneth J. Beatrice, East Haddam; George M. Christie, Oakdale, both of Conn.

[73] Assignee: The United States of America as represented by the Secretary of the Navy, Washington, D.C.

[21] Appl. No.: 20,939

[22] Filed: Feb. 22, 1993

[51] Int. Cl.[5] .............................................. F16L 35/00
[52] U.S. Cl. ........................................ 285/81; 285/86; 285/419; 285/315; 285/316; 251/89.5; 137/382
[58] Field of Search ............... 285/415, 86, 316, 81, 285/80, 315, 244, 318, 307, 308, 373, 419, 313; 251/90, 89.5; 137/377, 382

[56] References Cited

U.S. PATENT DOCUMENTS

| | | | |
|---|---|---|---|
| 944,877 | 12/1909 | Koschinski | 285/415 X |
| 1,913,030 | 6/1933 | Hux | 285/415 X |
| 2,797,110 | 6/1957 | Covington | 285/86 |
| 3,028,179 | 4/1962 | Abramoska | 285/81 X |
| 3,488,073 | 1/1970 | Wold | 285/388 |
| 3,583,667 | 6/1971 | Amneus, Jr. | 285/86 X |
| 4,148,459 | 4/1979 | Martinez | 285/316 X |
| 4,527,816 | 7/1985 | Bresie et al. | 285/81 |
| 4,580,788 | 4/1986 | Rabe et al. | 285/353 X |
| 4,664,420 | 5/1987 | Demeri | 285/316 X |
| 4,728,130 | 3/1988 | Corzine | 285/318 X |

FOREIGN PATENT DOCUMENTS

| | | | |
|---|---|---|---|
| 0099009 | 1/1984 | European Pat. Off. | 285/80 |
| 1133351 | 11/1968 | United Kingdom | 285/415 |
| 1275684 | 5/1972 | United Kingdom | 285/316 |
| 2186044 | 8/1987 | United Kingdom | 285/316 |

*Primary Examiner*—Randolph A. Reese
*Assistant Examiner*—Heather Chun Shackelford
*Attorney, Agent, or Firm*—Michael J. McGowan; Prithvi C. Lall; James M. Kasischke

[57] ABSTRACT

A mechanical locking device for use with conventional quick disconnect fluid coupling having a release collar on the female component spaced from a flange or nut also on the female component. Upper and lower half shells of the locking device fit between the release collar and flange to prevent inadvertent movement of the release collar. The half shells are assembled by two threaded fasteners which must be unthreaded to remove the device from the fluid coupling.

10 Claims, 1 Drawing Sheet

LOCKING DEVICE FOR FLUID COUPLING

The invention described herein may be manufactured and used by or for the Government of the United States of America for governmental purposes without the payment of any royalties thereon or therefore.

BACKGROUND OF THE INVENTION

1 Field of the Invention

The present invention relates to the use of quick disconnect fluid couplings in an environment where the fluid lines provided with such couplings are apt to be moved about or pulled inadvertently so as to cause inadvertent release of the quick disconnect release collar leading to interruption in the operation of equipment and sometimes placing personnel and equipment in jeopardy. More specifically, the present invention relates to a mechanical lock suitable for use on quick disconnect couplings.

2 Description of the Prior Art

U.S. Pat. No. 3,583,667 discloses a complex quick disconnect coupling that includes an axially movable locking sleeve that is designed to prevent relative rotation between the coupling components and to also prevent separation of these components.

U.S. Pat. No. 3,587,032 discloses a separable connector with a selectively movable locking sleeve that is designed to prevent separation of the two electrical connector parts.

U.S. Pat. No. 4,436,325 discloses a locking slip coupling for joining two tubular elements in a sealed relationship. A compressive force exerted on the locking sleeve causes gripping teeth to penetrate a surface of an inner component of the device.

U.S. Pat. No. 4,790,571 discloses a quick disconnect coupling connector with an axially movable ring that is designed to prevent radial deformation of one of the coupling components. Interlocking teeth are provided on both coupling components to achieve the locking feature.

What is desired is to avoid the necessity for redesigning a conventional quick disconnect fluid coupling, and yet to realize many of the advantages set out in the prior art without resort to nonconventional quick disconnect couplings of complex configuration.

SUMMARY OF THE INVENTION

The general purposes of the present invention is to permit a conventional quick disconnect fluid coupling to be rendered more secure by a simple mechanical locking device. Such conventional quick disconnect couplings are used in both pneumatic and hydraulic lines that must sometimes be segmented in relatively short lengths giving rise to the necessity for the use of many quick disconnect couplings to create the desired fluid supply and return conditions in a test fixture such as those operated by the Naval Undersea Warfare Center.

The foregoing object is accomplished with the present invention by providing a mechanical locking device for use with a quick disconnect fluid coupling of the type having mating components capable of being connected and disconnected quickly by means of an axially movable release collar provided on one fluid coupling component. Such a release collar is axially biased away from an annular flange on the coupling component provided with the collar. The locking device comprises upper and lower half shells that in turn define first and second axially spaced annular abutment surfaces. The first of these abutment surfaces is adapted to engage the flange on the fluid coupling component carrying the release collar, and the second abutment surface at the opposite end of the half shell assembly is adapted to engage the release collar itself. These half shells are held in place on the flexible coupling by means of one or more threaded fasteners received in openings and provided in the upper half shell and threadably received in threaded openings provided in the lower half shell.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
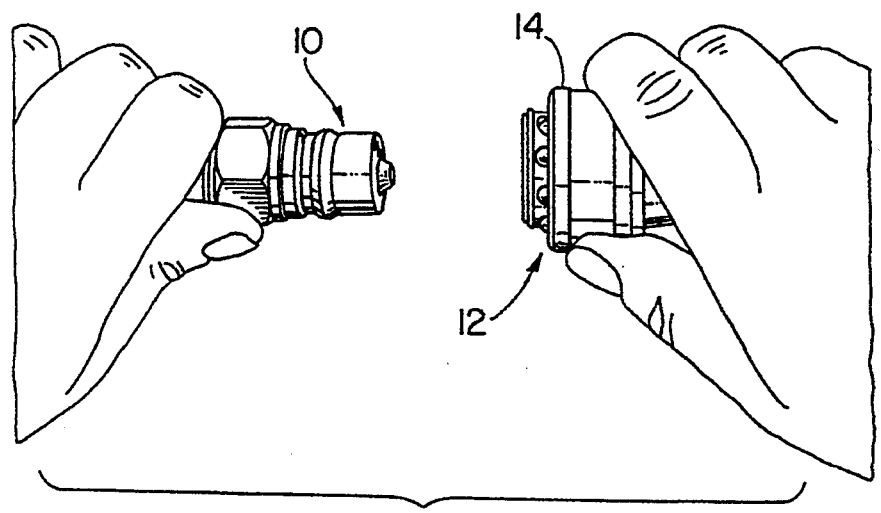
FIG. 1 shows a conventional fluid coupling of the quick disconnect type having mating components capable of being connected, and disconnected quickly by manipulation of an axially movable release collar provided on one of the fluid coupling components.

Referring now to FIG. 1 in greater detail, there is illustrated a disconnected fluid coupling comprising mating components 10 and 12 that can be conveniently connected by inserting male component 10 into female component 12. A release collar 14 is provided to lock male component 10 to female component 12 but if for any reason release collar 14 on female coupling component 12 moves, as for example to the position shown for it in FIG. 1, then in this event components 10 and 12 separate axially from one another.

Thus, and by way of summary, release collar 14 on female coupling component 12 is intended to be moved from the position shown for it in FIG. 1 for purposes of disconnecting coupling components 10 and 12 from their connected relationship one to the other. In the environment of a test fixture of the type operated by the Naval Undersea Warfare Center, many such fluid couplings are provided in setting up such a facility for a typical test or the like. In this situation, the release collar of any one of these many flexible couplings can be caused to move to the position shown for it in FIG. 1 other than by manual manipulation as suggested in this view. In such a case, the fluid coupling can readily be disconnected causing a condition that is unsatisfactory and which may be dangerous in some cases.

Figure 2:
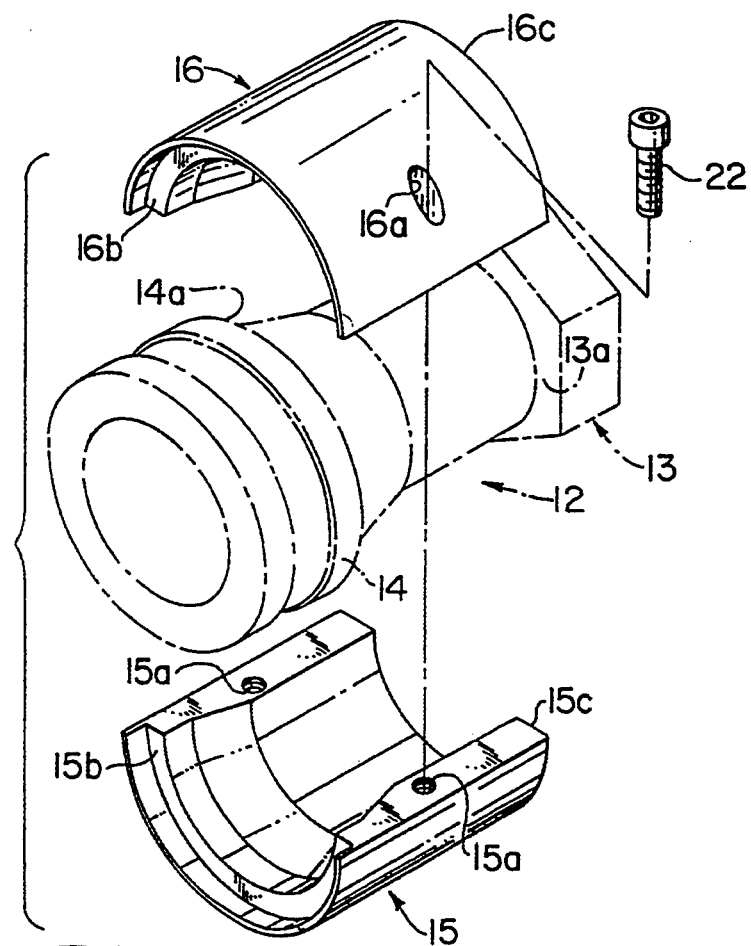
FIG. 2 shows the one fluid coupling component with the fluid coupling in dotted lines, and shows in exploded relationship with respect to this coupling component a locking device constructed in accordance with the present invention.

FIG. 2 illustrates in dotted lines female component 12 of the fluid coupling illustrated in FIG. 1. More specifically, this female coupling component 12 not only has release collar 14 provided at the open end thereof, but also includes a nut 13, which nut 13 in turn defines an annular surface 13a which is arranged in axially opposed relationship to backside 14a of release collar 14. Female fluid coupling component 12 has a reduced diameter in the area between these opposed annular surfaces 13a and 14a, which geometry is taken advantage of in accordance with the present invention by providing a mechanical locking device between these two surfaces 13a and 14a.

Still with reference to FIG. 2, the above mentioned locking device includes lower and upper half shells 15 and 16 respectively. Half shells 15 and 16 are illustrated in exploded relationship, and the upper half shell 16 is seen to include at least one and preferably two stepped openings 16a that are adapted to receive the head portion of a screw type fastener 22. Screw fasteners 22 are provided in opposite sides of upper half shell 16 so to be threadably received in threaded openings 15a provided for this purpose in lower half shell 15. Openings 15a and 16a in these half shells are aligned with one another for so receiving the fasteners 22.

When assembled by fastener means 22 half shells 15 and 16 provide an assembly that is adapted to secure release collar 14 in the locked position as shown in FIG. 2 and to prevent axial movement of release collar 14 from the locked position of FIG. 2 toward the unlocked position illustrated in FIG. 1. This securing feature is achieved as a result of the engagement between the axially spaced annular flanges 13a and 14a and the correspondingly contoured annular abutment surfaces defined by the half shells. The right hand end portion of half shells 15 and 16 define an annular abutment surface 15c and 16c for engagement with the left facing flange 13a of the nut on the coupling component 13. The left hand end portion of half shells 15 and 16 define an annular abutment surface 15b and 16b for engagement with the right facing flange of the collar 14 on the coupling component 12. When half shells 15 and 16 are so assembled with one another, and with the female coupling component 12, axial movement of release collar 14 from the locked position to the release position shown in FIG. 1 is prevented.

Half shells 15 and 16 can be manufactured from any rigid material that is compatible with the environment and female coupling component 12. In the current embodiment aluminum or steel is used, but the device is not limited to those materials.

In light of the above, it is therefore understood that within the scope of the appended claims, the invention may be practiced otherwise than as specifically described.

What is claimed is:

1. A mechanical locking device for use with a quick disconnect coupling of the type having mating components capable of being connected, and disconnected quickly by means of an axially movable release collar provided on one fluid coupling component, and wherein the release collar is axially biased away from an annular flange on the one coupling component, said locking device comprising:
   a pair of half shells defining first and second axially spaced annular abutment surfaces;
   said first abutment surface adapted to engage the flange on the one fluid coupling component;
   said second abutment surface adapted to engage the release collar provided on the one fluid coupling component; and
   a fastening means for releasably securing said half shells in assembled relationship to one another whereby said first abutment surface engages the one fluid coupling component flange and said second abutment surface engages the release collar.

2. The mechanical locking device of claim 1 wherein said means releasably securing said half shells in assembled position comprises at least one fastener provided in at least one opening of one of said half shells, said other half shell defining means for releasably receiving said fastener.

3. The mechanical locking device of claim 1 wherein said half shells have a generally cylindrical external contour when assembled and a wall thickness, and wherein said means releasably securing said half shells comprises at least two threaded fasteners, each fastener having a head portion received in a stepped opening of said one half shell, and each of said fasteners having a threaded portion threadably received in a threaded opening defined by said other half section, said openings correspondingly aligned with said threaded openings.

4. The mechanical locking device of claim 3 wherein said assembled half shells have an internal contour configuration such that the said half shell wall thickness varies in the axial direction, said openings provided in the half shell walls where the wall thickness is greatest.

5. The mechanical locking device of claim 4 wherein each of said half shells has said greatest wall thickness adjacent at said first abutment surface adapted to engage said annular flange.

6. A locking quick disconnect coupling comprising:
   a quick disconnect coupling of the type having mating components capable of being connected, and disconnected quickly by means of an axially movable release collar provided on one fluid coupling component, and wherein the release collar is axially biased away from an annular flange on the one coupling component;
   a pair of half shells defining first and second axially spaced annular abutment surfaces;
   said first abutment surface adapted to engage the flange on the one fluid coupling component;
   said second abutment surface adapted to engage the release collar provided on the one fluid coupling component; and
   a fastening means for releasably securing said half shells in assembled relationship to one another whereby said first abutment surface engages the one fluid coupling component flange and said second abutment surface engages the release collar.

7. The locking quick disconnect coupling of claim 6 wherein said fastening means releasably securing said half shells in assembled position comprises at least one fastener provided in at least one opening of one of said half shells, said other half shell defining means for releasably receiving said fastener.

8. The locking quick disconnect coupling of claim 6 wherein said half shells have a generally cylindrical external contour when assembled and a wall thickness, and wherein said fastening means for releasably securing said half shells comprises at least two threaded fasteners, each fastener having a head portion received in a stepped opening of said one half shell, and each of said fasteners having a threaded portion threadably received in a threaded opening defined by said other half section, said openings correspondingly aligned with said threaded openings.

9. The locking quick disconnect coupling of claim 8 wherein said assembled half shells have an internal contour configuration such that the said half shell wall thickness varies in the axial direction, said openings provided in the half shell walls where the wall thickness is greatest.

10. The locking quick disconnect coupling of claim 9 wherein each of said half shells has said greatest wall thickness adjacent at said first abutment surface adapted to engage said annular flange.

* * * * *